(12) United States Patent
Tian et al.

(10) Patent No.: US 7,246,801 B2
(45) Date of Patent: Jul. 24, 2007

(54) SELF-TIGHTENING KEYLESS CHUCK

(75) Inventors: Xianming Tian, Changzhi (CN); Huijun Pei, Changzhi (CN); Lihang Su, Changzhi (CN); Qiaoyu Xu, Changzhi (CN)

(73) Assignee: Shanxi Huifeng Power Tools Co., Ltd., Shanxl Province (CN)

( * ) Notice: Subject to any disclaimer, the term of this patent is extended or adjusted under 35 U.S.C. 154(b) by 92 days.

(21) Appl. No.: 10/511,404

(22) PCT Filed: Aug. 9, 2002

(86) PCT No.: PCT/CN02/00554

§ 371 (c)(1),
(2), (4) Date: Oct. 12, 2004

(87) PCT Pub. No.: WO03/084700

PCT Pub. Date: Oct. 16, 2003

(65) Prior Publication Data

US 2005/0212223 A1    Sep. 29, 2005

(30) Foreign Application Priority Data

Apr. 10, 2002  (CN) ............................... 02 2 09233
May 15, 2002  (CN) ............................... 02 1 19714

(51) Int. Cl.
*B23B 31/02*  (2006.01)
*B23B 31/10*  (2006.01)

(52) U.S. Cl. ..................... 279/62; 279/902; 384/615
(58) Field of Classification Search .................. 279/62, 279/902, 60, 61, 140; 385/615
See application file for complete search history.

(56) References Cited

U.S. PATENT DOCUMENTS

| 2,910,302 | A | * | 10/1959 | Ondeck | 279/22 |
| 4,305,597 | A | * | 12/1981 | McCarty | 279/22 |
| 5,044,643 | A | * | 9/1991 | Nakamura | 279/60 |
| 5,145,194 | A |  | 9/1992 | Huff et al. | 279/62 |
| 5,174,588 | A |  | 12/1992 | Reibetanz et al. | 279/62 |
| 5,215,317 | A | * | 6/1993 | Jordan et al. | 279/63 |
| 5,411,275 | A | * | 5/1995 | Huff et al. | 279/62 |
| 5,476,273 | A | * | 12/1995 | Shadeck et al. | 279/60 |

(Continued)

FOREIGN PATENT DOCUMENTS

| CN | 2233298 Y | 8/1996 |
| CN | 2235871 Y | 9/1996 |

*Primary Examiner*—Monica Carter
*Assistant Examiner*—Michael W. Talbot
(74) *Attorney, Agent, or Firm*—Mayer & Williams PC; Karin L. Williams, Esq.

(57) ABSTRACT

The present invention relates to a self-tightening keyless chuck to enable electric percussive drills to grip a tool shank. The chuck includes a rear sleeve, a body, a bearing ring, a bearing assembly, a nut, a jaw, a front sleeve and a stopper and so on. The bearing assembly utilizing a ball bearing is positioned with a circumferential arcuate race with a fixed depth, and the bottom surfaces of said circumferential arcuate race are provided with a plurality of ball-shape grooves. During the chuck grips a tool shank, the balls of said ball-bearing enter into the ball-shape grooves and are locked there, so as to prevent the tool from loosening due to the percussion vibration. In addition, the front sleeve engages with a nut through radial smooth press-fit to securely transmit a torque.

8 Claims, 8 Drawing Sheets

U.S. PATENT DOCUMENTS

| | | | |
|---|---|---|---|
| 5,531,461 A * | 7/1996 | Huff et al. | 279/62 |
| 5,669,616 A * | 9/1997 | Ho | 279/62 |
| 5,934,689 A * | 8/1999 | Montjoy | 279/62 |
| 5,944,328 A * | 8/1999 | Lin et al. | 279/62 |
| 6,010,135 A * | 1/2000 | Miles et al. | 279/62 |
| 6,217,033 B1 * | 4/2001 | Sakamaki et al. | 279/62 |
| 6,260,856 B1 * | 7/2001 | Temple-Wilson | 279/62 |
| 6,991,238 B2 * | 1/2006 | Yang et al. | 279/62 |
| 7,040,630 B2 * | 5/2006 | Huggins et al. | 279/62 |
| 2002/0180164 A1 * | 12/2002 | Aultman et al. | 279/61 |

* cited by examiner

3A

3B

SELF-TIGHTENING KEYLESS CHUCK

FIELD OF THE INVENTION

The present application relates to a keyless chuck and, more particularly, to a self-tightening keyless chuck. Generally, an electric percussive drill is capable of reciprocating, percussive vibration as well as rotary motion. Therefore, the present invention particularly provides a self-tightening keyless chuck for maintaining a secure grip on such a tool in percussive motion.

BACKGROUND ART

A variety of keyless chucks have been developed so far. A conventional chuck generally comprises a rear sleeve, a body, a bearing ring, a bearing, a nut, a jaw, a front sleeve, a stopper and so one. The jaw extends/retracts under the rotation of the nut and the engagement of conical threads, and the nut is rotated by movement of the front sleeve. Such a chuck is keyless if the front sleeve is rotated by hand. The chuck may be attached to a driving shaft of a drill by means of threads or a conical bore.

A conventional keyed or keyless chuck has the disadvantage that because the nut and the jaw are secured only by rotation of threads, the jaw tends to loosen its grip on a tool due to axial percussive vibrations transmitted through the chuck and the tool during operation. This will cause the tool to skid, thus resulting in a loss of working efficiency and a loss of safety.

A conventional chuck is disclosed in Chinese Patent Publication CN1068532 (Chinese Patent Number: ZL 92104999.4), in which the anti-percussion of the chuck is achieved by forming spokewise grooves in the surfaces of two members that act as bearing races, the opposing sides of the grooves being provided with round angles of different radii. The depth of the grooves has a great influence on the anti-percussion ability of the chuck as well as on the release of the chuck. If the grooves are too deep, the chuck will not be released after use. If the grooves are too shallow, the chuck will have a poor anti-percussion performance. Therefore, in order to keep a uniform depth of the grooves in all members to thereby ensure the anti-percussion ability of all chucks, it is necessary to frequently adjust the machine for manufacturing the members. This, however, will affect the efficiency of production and can result in an increase of defective products. To overcome this drawback, it is necessary to provide a pressing machine with a higher pressing accuracy or larger tonnage, which however will increase the cost of production.

Furthermore, the front sleeve of a conventional keyless chuck is generally made of plastic. The chuck generally has a configuration in which a steel ring is embedded in an inner side of the plastic front sleeve, and two nut halves that are placed in a circular groove in the body of the chuck are press-fit into the hole of the steel ring embedded in the inner side of the plastic front sleeve, thereby securing the two nut halves in the circular groove in the body. This configuration, however, is complicated in structure and manufacturing process, and the front sleeve of the chuck which has a low strength is susceptible in damage.

SUMMARY OF THE INVENTION

To overcome the aforementioned disadvantages and drawbacks in the prior art, the present invention provides a safe and simple self-tightening keyless chuck, which has a locking function and improves the strength of a front sleeve and which is less susceptible to loosening when used for a percussive tool.

In order to fulfill the above object, the present invention employs the following technical solution.

The invention provides a self-tightening keyless chuck for gripping a tool shank, comprising a rear sleeve, a body, a bearing ring, a bearing assembly, a nut, a jaw, a front sleeve and a stopper, wherein the surface of at least one of the bearing ring and the nut that faces the bearing assembly is provided with a recessed circumferential arcuate race, and a plurality of ball-shape grooves are uniformly formed in an arcuate bottom surface of the arcuate race, and wherein the front sleeve engages with the nut through radial smooth press-fit.

The nut is provided with two angularly-cut split notches that are symmetrically positioned on both ends of a diameter of the nut, the angularly-cut split notches having a cut-out angle between 30 and 75°.

Alternatively, the invention provides a self-tightening keyless chuck for gripping a tool shank, comprising: a rear sleeve, a body, an upper bearing ring, a bearing assembly, a lower hearing ring, a nut, a jaw, a front sleeve and a stopper, wherein the surface of at least one of the upper and lower bearing rings that faces the bearing assembly is provided with a recessed circumferential arcuate race, and a plurality of ball-shape grooves are uniformly formed in the arcuate bottom surface of the arcuate race, and wherein the front sleeve engages with the nut through radial smooth press-fit.

In this self-tightening keyless chuck, the nut is provided with two angularly-cut split notches that are symmetrically positioned on both ends of a diameter of the nut, the angularly-cut split notches having a cut-out angle between 30 and 75°. Further, two parallel cut-out surfaces are symmetrically formed on the outer peripheral surface of the nut, which extend downwards in an axial direction from the front end surface of the nut by one third of the thickness of the nut and are located at an angle of 90° relative to the positions of angularly-cut split notches.

The front sleeve is press cast using a press-casting metal or a powdered metallurgic material.

In the above two self-tightening keyless chucks, the recessed circumferential arcuate race has an arc radius R of from 1.5 to 2.5 millimeters.

The recessed circumferential arcuate race has a depth 11 from 0.05 to 0.30 millimeters.

The number of ball-shaped grooves ranges from 20 to 80.

The ball-shaped grooves have a spherical radius r from 1.0 to 2.0 millimeters.

The ball-shaped grooves have a depth h from 0.01 to 0.10 millimeters.

In the alternative self-tightening keyless chucks for gripping a tool shank, the upper bearing ring and the lower bearing ring may have the same external dimensions and the same surface structure.

The upper bearing ring and the lower bearing ring may also have different external dimensions and different surface structures, and their differences include the inside diameter and the thickness of the bearing rings.

During operation, the balls of the bearing assembly enter the ball-shaped grooves of the bearing ring or the nut and are locked therein. Alternatively, the balls of the bearing assembly enter the ball-shaped grooves of the upper bearing ring or the lower bearing ring and are locked therein. Thus, the nut is less susceptible to loosening in operation, so that the chuck maintains a great gripping force.

The present invention has an advantage that the depth of the ball-shaped grooves which is essential to the anti-percussion ability of the chuck is determined by a mould. That is, the optimum distance (i.e., depth of the ball-shaped grooves) between the ball-shaped grooves and the arcuate bottom surface of the recessed circumferential arcuate race has been determined during the manufacturing of the mould. In this way, the pressing of the members has nothing to do with the adjustment or accuracy of the machine for manufacturing the members, whereby the depth of the ball-shaped grooves in all members can be constantly maintained within an optimum range to ensure the anti-percussion performance of all chucks.

The present invention has another advantage that due to the use of the recessed arcuate race, the balls of the bearing assembly are constantly constrained within the arcuate race. This will ensure the centering of the members under force, so that the three jaws of the chuck are subjected to a uniform force to thereby increase the gripping force.

The present invention has still another advantage that because the front sleeve is press cast using a press-casting metal or a powdered metallurgic material, the front sleeve has an increased strength and can be directly engaged with the nut through press-fit to securely transmit a torque.

By using the above configurations, the present invention overcomes the problem that a conventional chuck either does not have a locking means or has a locking means with unsatisfactory performance. The chuck according to the present invention can be operated in a quick, reliable, safe and convenient way. It provides such advantages as a reasonable structure, a convenient assembly, a stable performance and a reliable operation. The present invention can be used in all kinds of keyed or keyless chucks.

DETAILED DESCRIPTION OF THE EMBODIMENTS

A detailed description of the present invention is provided with reference to the drawings and embodiments below.

Figure 1:
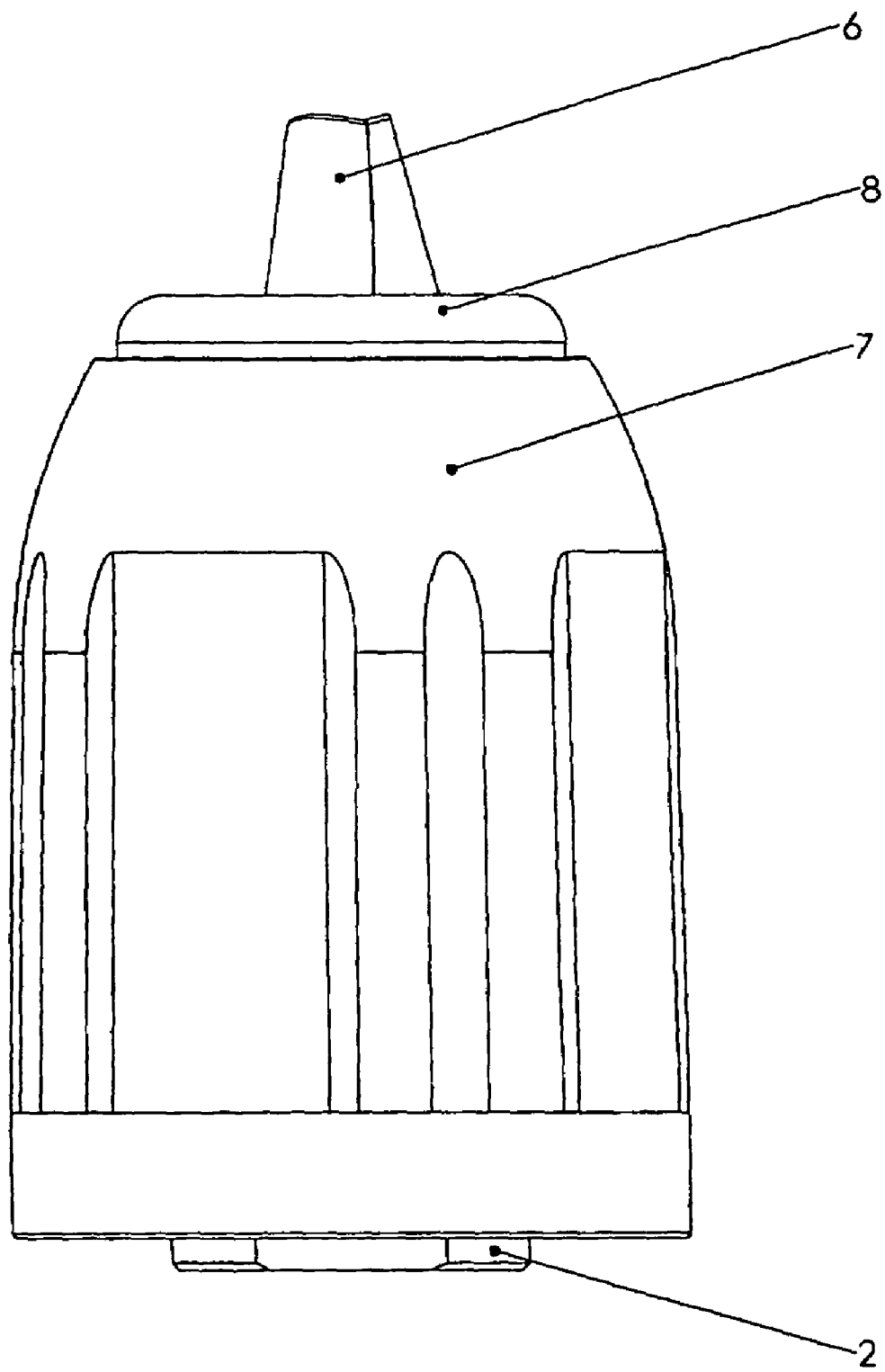
FIG. 1 is a front view of a self-tightening keyless chuck according to the present invention.

FIG. 1 is a front view of a keyless chuck manufactured according to the preferred embodiment of the present invention.

Figure 2:
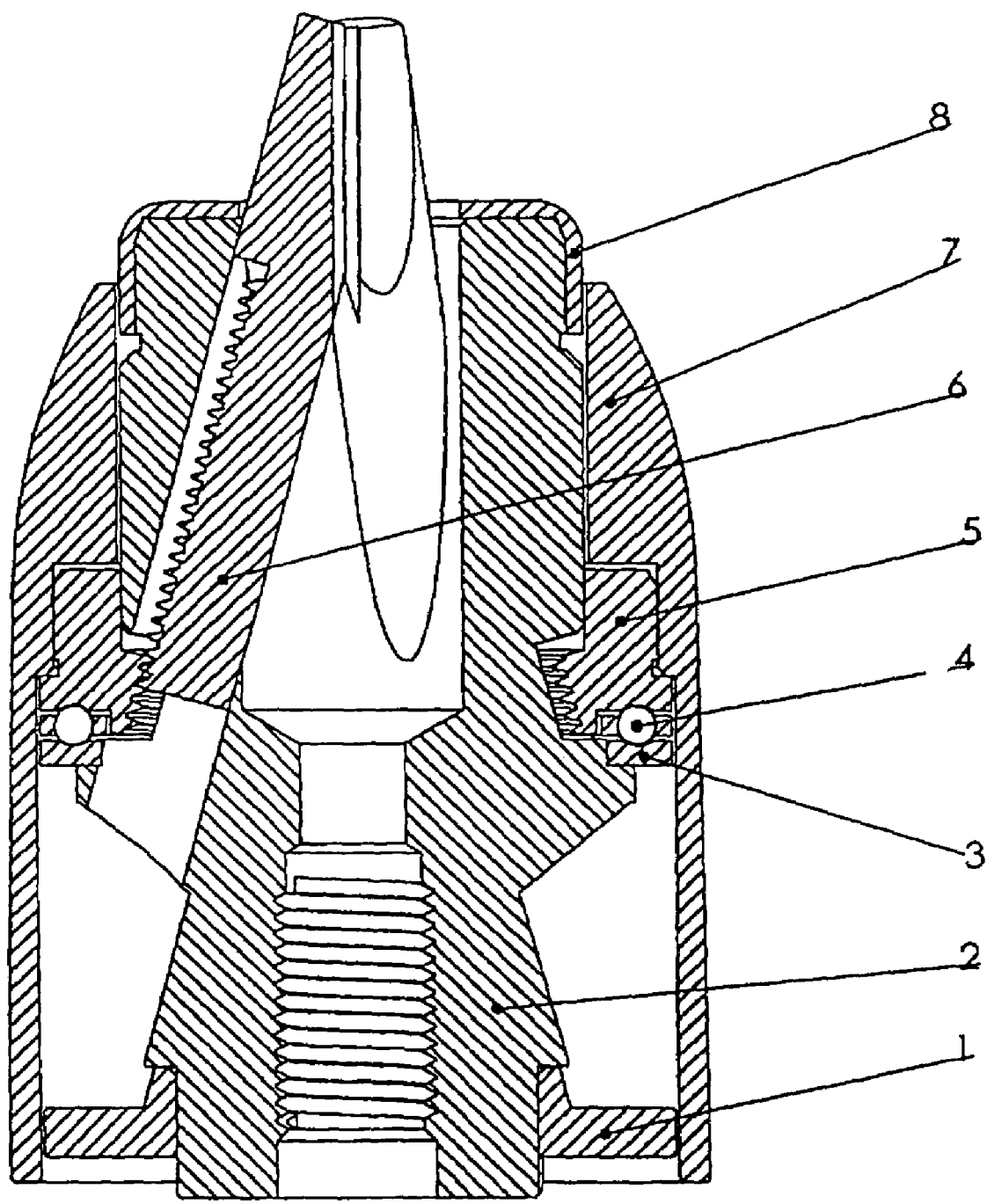
FIG. 2 is an axial, longitudinal sectional view according to an embodiment of the present invention shown in FIG. 1.

FIG. 2 is an axial, longitudinal sectional view of a self-tightening chuck according to an embodiment of the present invention, wherein the chuck comprises a rear sleeve 1, a body 2, a bearing ring 3, a bearing assembly 4, a nut 5, a jaw 6, a front sleeve 7 and a stopper 8. The relations of these elements are known in the art, and hence a detailed description thereof is omitted.

Figure 3:
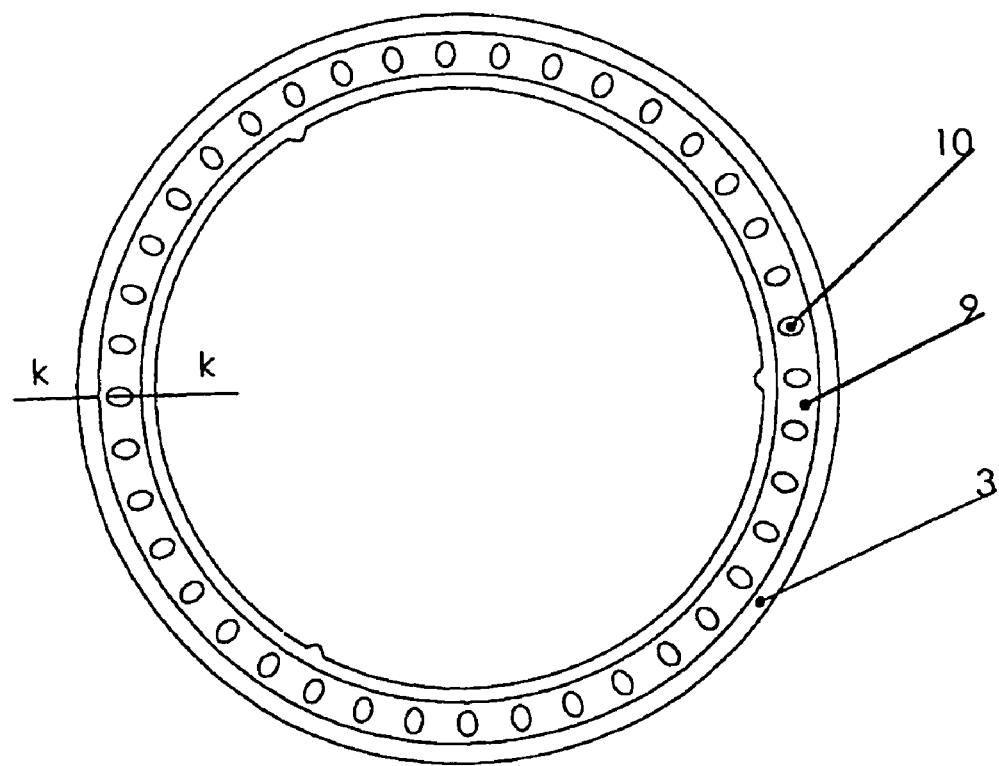
FIG. 3A is a front view of a bearing ring according to an embodiment of the present invention.
FIG. 3B is a perspective view of a bearing ring according to an embodiment of the present invention.
Figure 3:
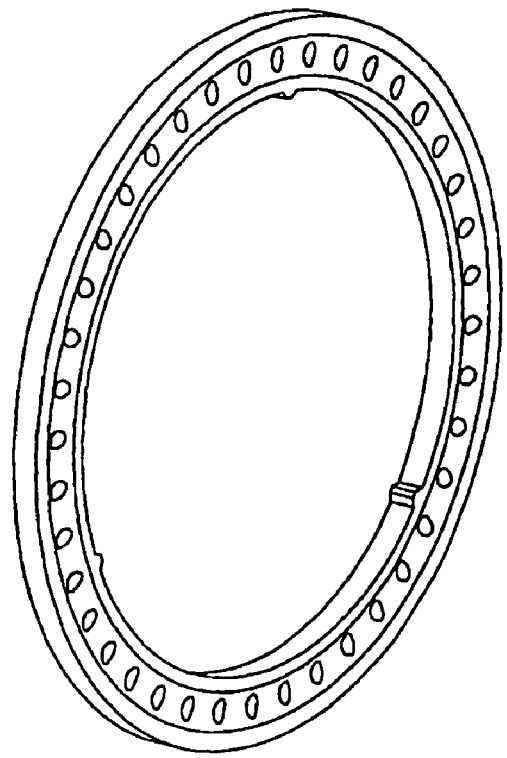
Figure 4:
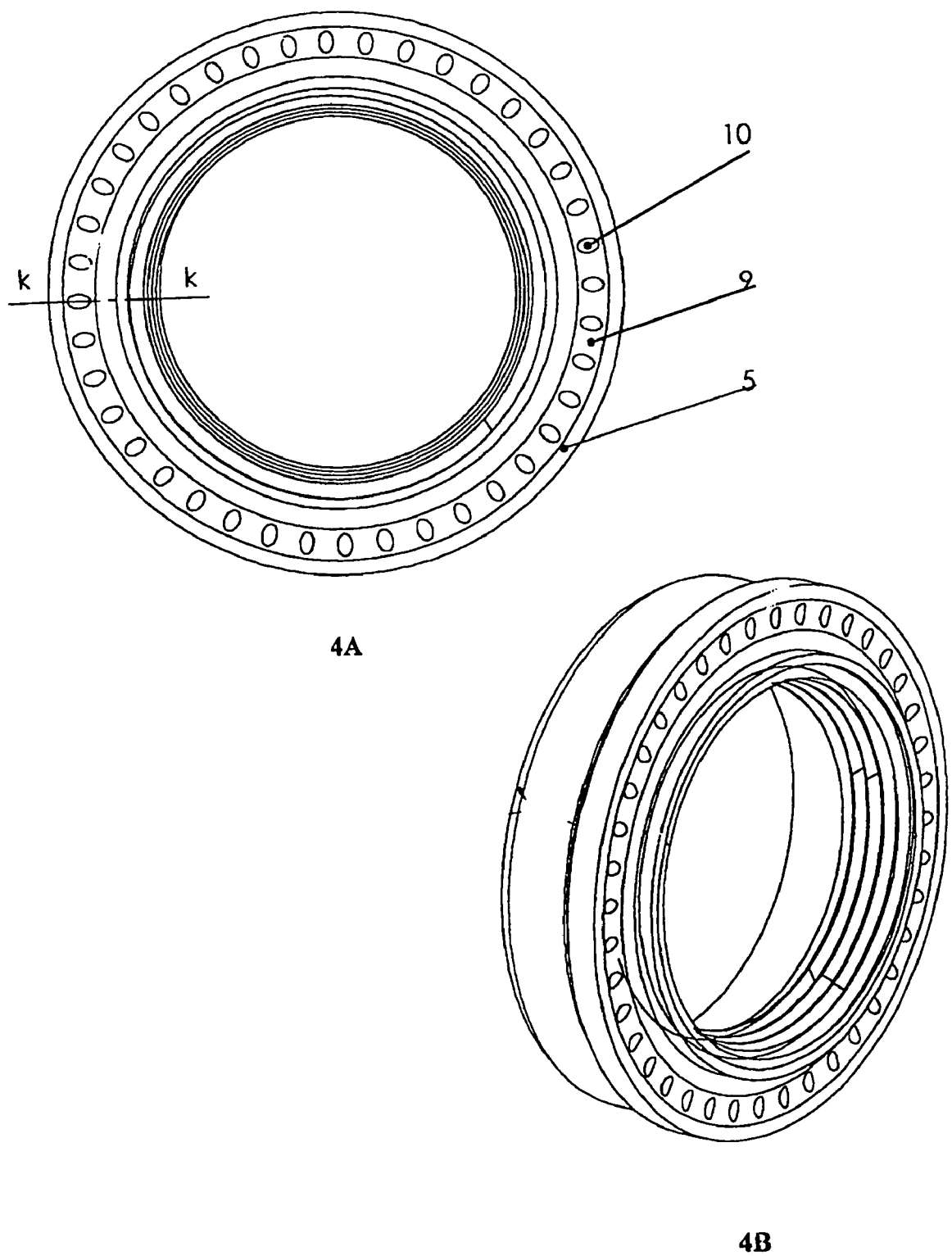
FIG. 4A is a front view of a nut according to an embodiment of the present invention.
FIG. 4B is a perspective view of a nut according to an embodiment of the present invention.
Figure 5:
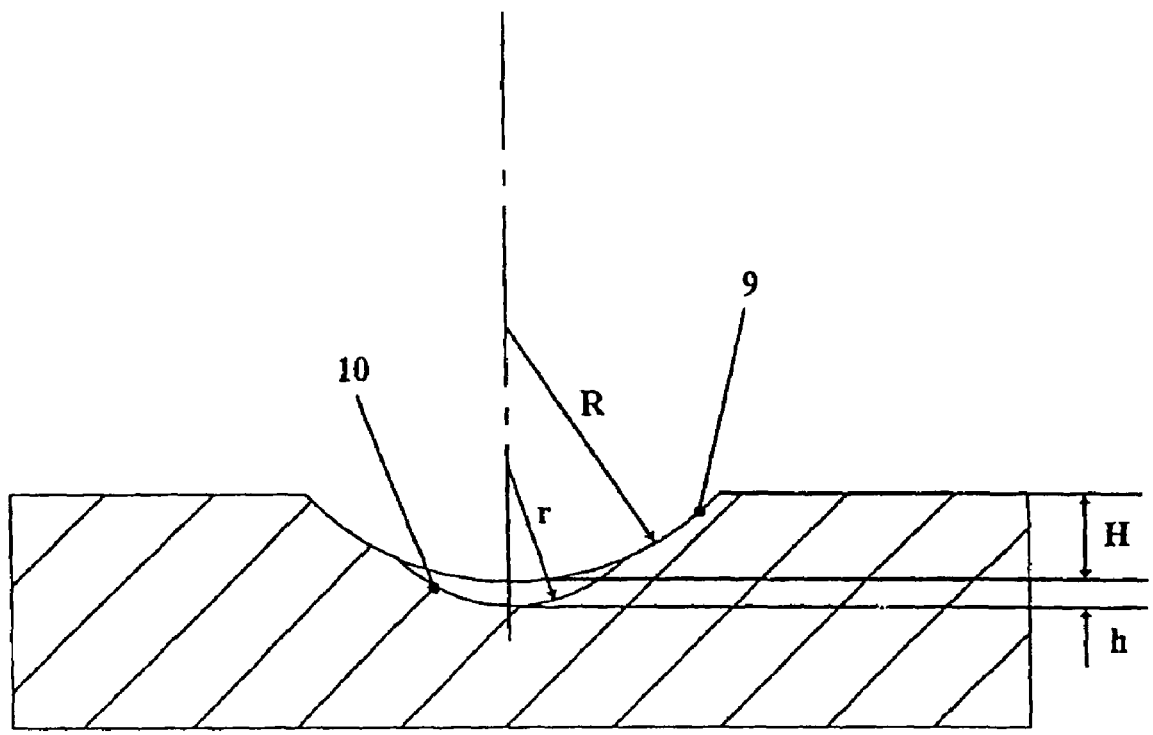
FIG. 5 is a partially enlarged cross-sectional view of a ball-shaped groove in an arcuate bottom surface of an arcuate race used in common by a bearing ring and a nut according to an embodiment of the present invention, i.e., an enlarged cross sectional view taken along line k—k in FIGS. 3A and 4A.
Figure 7:
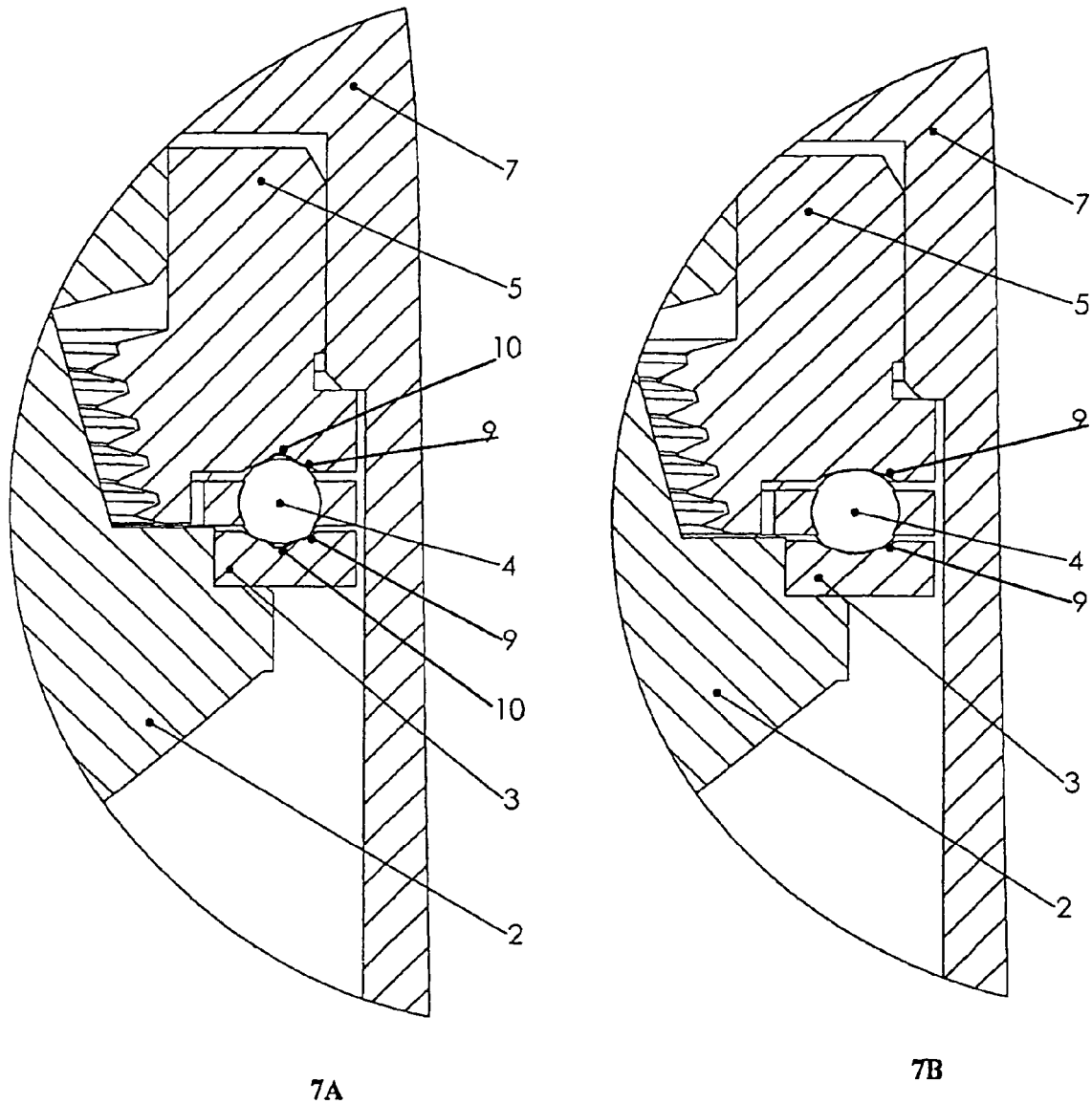
FIG. 7A is a partially enlarged view in which the balls of a bearing assembly are outside ball-shaped grooves (i.e., the balls are in a non-self-tightening state).
FIG. 7B is a partially enlarged view in which the balls of a bearing assembly are inside ball-shaped grooves (i.e., the balls are in a self-tightening state).
Figure 8:
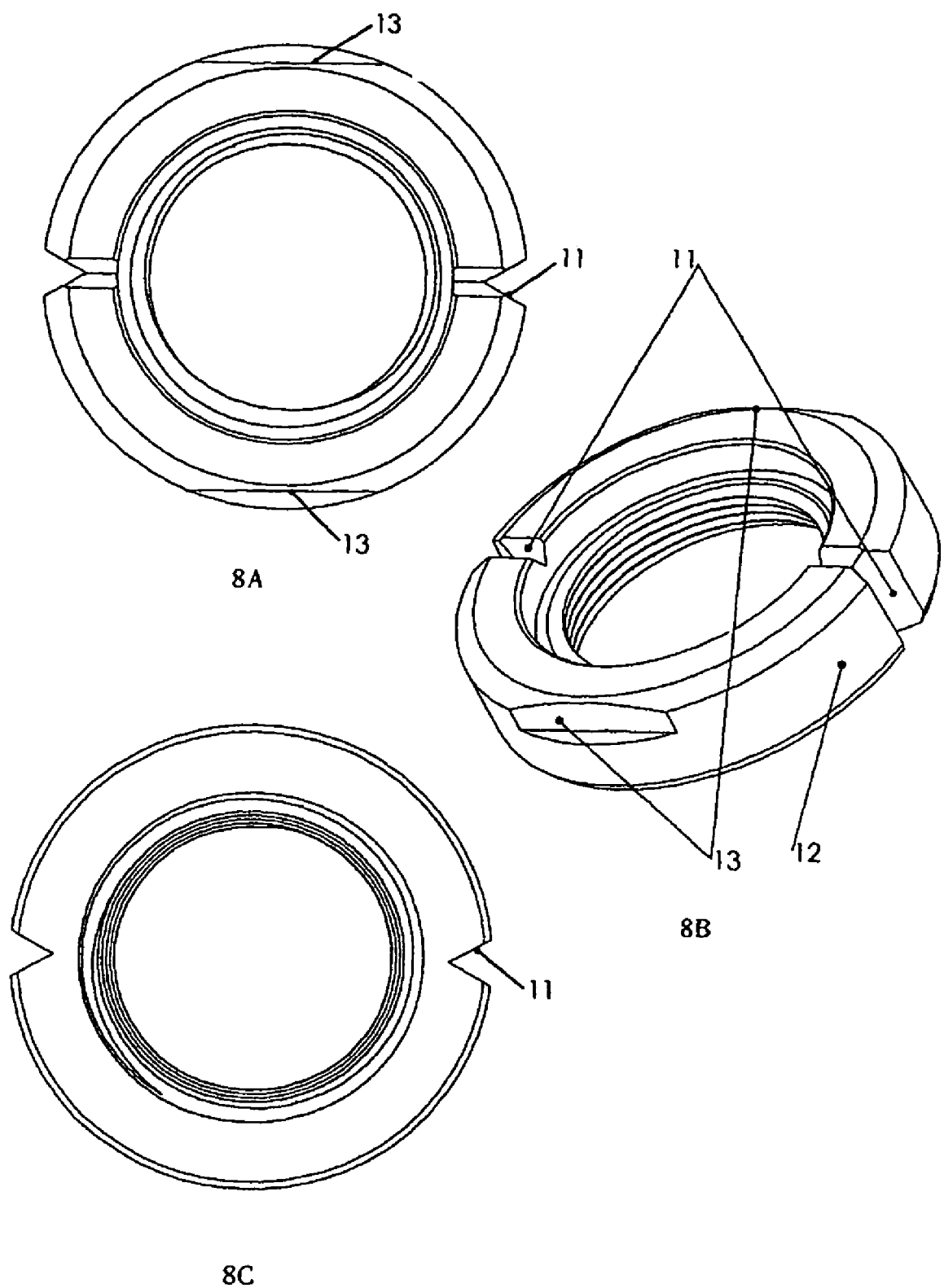
FIG. 8A is a front view of a nut according to another embodiment of the present invention.
FIG. 8B is a perspective view of a nut according to another embodiment of the present invention.
FIG. 8C is a rear view of a nut according to another embodiment of the present invention.

Referring to FIGS. 3, 4 and 5, the bearing ring 3 has a race surface that is provided with a circumferential arcuate race 9 with a fixed depth. When viewed from the cross section along line k—k, the circumferential arcuate race 9 has an arc radius R of 2.0 millimeters and a depth 11 of 0.15 millimeters. The circumferential arcuate race 9 has an arcuate bottom surface that is provided with 40 ball-shaped grooves 10, which have a spherical radium r of 1.5 millimeters and a depth h of 0.05 millimeters. Further, the surface of the nut 5 that acts as the other race of the bearing assembly 4 is also provided with an circumferential arcuate race 9 and ball-shaped grooves 10 that are identical in shape and number to those formed on the bearing ring 3. During operation, as shown in FIG. 7, the jaw grips a tool shank as the nut 5 rotates, and the balls of the bearing assembly 4 goes into/out of the ball-shaped grooves. FIG. 7A shows a non-self-tightening state of the balls of the bearing assembly 4 in which the balls are outside the ball-shaped grooves. When the nut 5 is finally secured on the body 2, the balls of the bearing assembly 4 enter into the ball-shaped grooves 10 in the upper or lower race and are locked therein. FIG. 7B shows a self-tightening state of the balls of the bearing assembly 4 in which the balls are in the ball-shaped grooves. Thus, the percussive vibrations transmitted through the body 2 of the chuck are unlikely to overcome the difference between the high and low energy states of the balls of the bearing assembly 4, the low energy state corresponding to the location of the balls in the ball-shaped grooves. Depending upon the specific application of the chuck and the expected impact loads during operation, the choice of having ball-shaped grooves in either or both of the race surfaces of the nut 5 and the bearing ring 3 and the number and depth of the ball-shaped grooves can be optimized.

Figure 6:
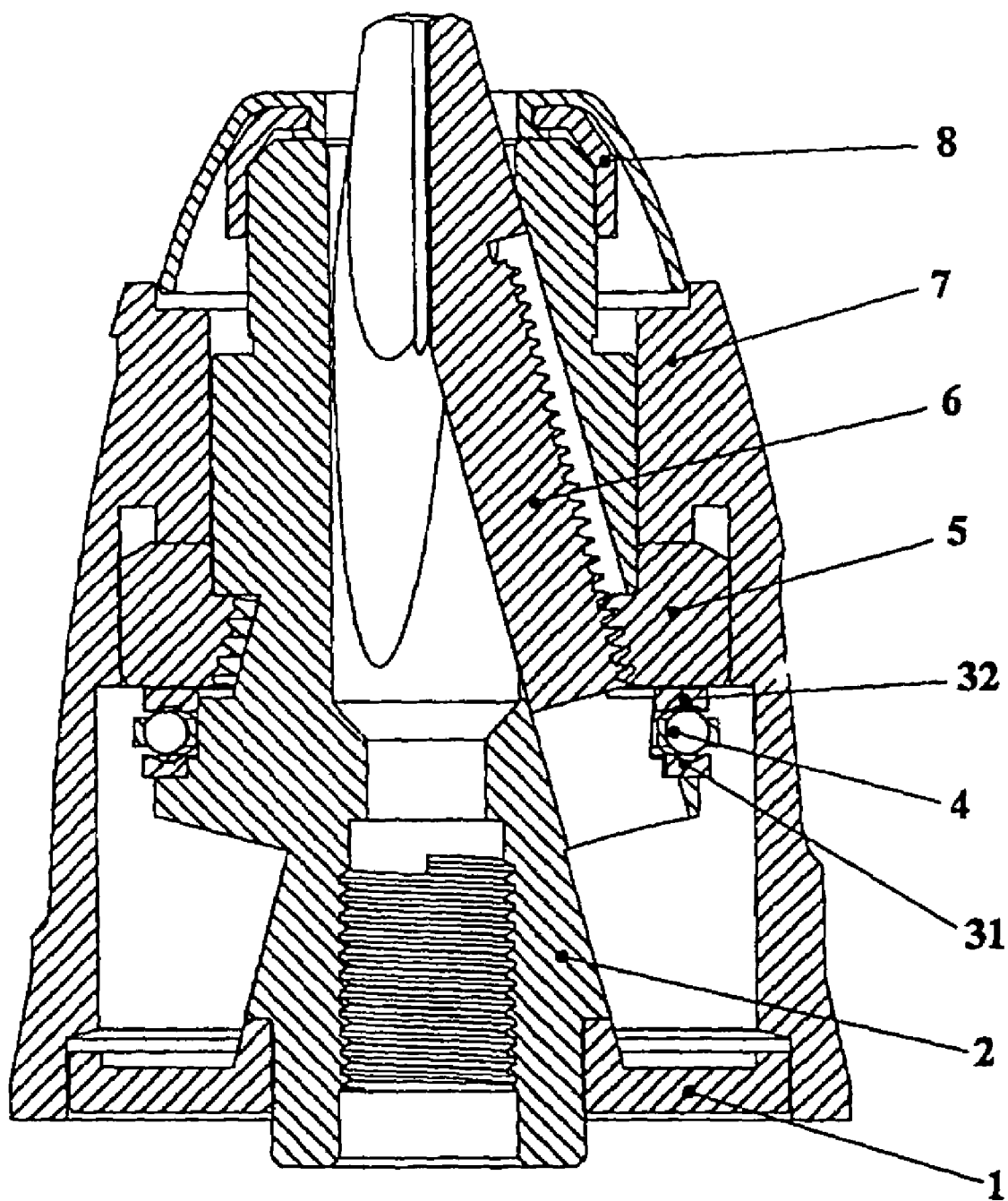
FIG. 6 is an axial, longitudinal sectional view according to another embodiment of the present invention shown in FIG. 1.

FIG. 6 is an axial, longitudinal sectional view of a self-tightening chuck according to another embodiment of the present invention, wherein the chuck comprises a rear sleeve 1, a body 2, an upper bearing ring 31, a bearing assembly 4, a lower bearing ring 32, a nut 5, a jaw 6, a front sleeve 7 and a stopper 8. In this embodiment, the lower bearing ring 32 is used as the other race of the balls of the bearing assembly 4 in place of the nut 5 in the previous embodiment. The upper bearing ring 31 and the lower bearing ring 32 may have the same external dimensions. The surface of at least one of the upper and lower bearing rings that faces the bearing assembly 4 is provided with a recessed circumferential arcuate race 9, and a plurality of ball-shape grooves 10 are uniformly formed in an arcuate bottom surface of the arcuate race 9. The chuck in this embodiment operates according to the same working principle as that in the previous embodiment, and hence a detailed description thereof is omitted.

During assembly, the metal front sleeve 7 engages, through press-fit, with the nut 5 that is placed in a circular groove in the body 2 and split into two halves by split notches 11. Thanks to the strength and the elastic/plastic deformability of the metal material per se, the metal front sleeve 7 is securely connected to the nut 5 through press-fit, thus ensuring transmission of an input torque. Before press-fit, the metal sleeve 7 is surface-treated by electrophoresis painting, static plastic spraying or anodized processing so that its surface meets different requirements in color.

What is claimed is:

1. A self-tightening keyless chuck for gripping a tool shank, comprising:
    a rear sleeve (1);
    a body (2);
    a bearing ring (3);
    a bearing assembly (4);
    a nut (5);
    a jaw (6);
    a front sleeve (7); and
    a stopper (8),
    wherein a surface of at least one of the bearing ring (3) and the nut (5) that faces the bearing assembly (4) is provided with a recessed circumferential arcuate race (9), and a plurality of ball-shape grooves (10) are uniformly formed in an arcuate bottom surface of the arcuate race (9), and
    wherein the front sleeve (7) engages with the nut (5) through radial smooth press-fit.

2. The self-tightening keyless chuck according to claim 1, wherein the nut (5) is provided with two angularly-cut split notches (11) that are symmetrically positioned on both ends of a diameter of the nut, the angularly-cut split notches (11) having a cut-out angle between 30 and 75°.

3. A self-tightening keyless chuck for gripping a tool shank, comprising:
    a rear sleeve (1);
    a body (2);
    an upper bearing ring (31);
    a bearing assembly (4);
    a lower bearing ring (32);
    a nut (5);
    a jaw (6);
    a front sleeve (7); and
    a stopper (8),
    wherein a surface of at least one of the upper bearing ring (31) and the lower bearing ring (32) that faces the bearing assembly (4) is provided with a recessed circumferential arcuate race (9), and a plurality of ball-shape grooves (10) are uniformly formed in an arcuate bottom surface of the arcuate race (9), and
    wherein the front sleeve (7) engages with the nut (5) through radial smooth press-fit.

4. The self-tightening keyless chuck according to claim 3, wherein the nut (5) is provided with two angularly-cut split notches (11) that are symmetrically positioned on both ends of a diameter of the nut, the angularly-cut split notches (11) having a cut-out angle between 30 and 75°,
    and wherein two parallel cut-out surfaces (13) are symmetrically formed on an outer peripheral surface of the nut (5), which extend downwards in an axial direction from a front end surface of the nut (5) by one third of a thickness of the nut and are located at an angle of 90° relative to the positions of angularly-cut split notches (11).

5. The self-tightening keyless chuck according to claim 1 or 3, wherein the front sleeve (7) is press cast using a press-casting metal or a powered metallurgic material.

6. The self-tightening keyless chuck according to claim 1 or 3, wherein the recessed circumferential arcuate race (9) has an arc radius R from 1.5 to 2.5 millimeters and a depth H from 0.05 to 0.30 millimeters.

7. The self-tightening keyless chuck according to claim 1 or 3, wherein the number of ball-shaped grooves (10) ranges from 20 to 80.

8. The self-tightening keyless chuck according to claim 1 or 3, wherein the ball-shaped grooves (10) have a spherical radius r from 1.0 to 2.0 millimeters and a depth h from 0.01 to 0.10 millimeters.

* * * * *